Aug. 6, 1968 H. GERHARD 3,395,824
LIQUID CONTAINER COMPOSED OF SQUARE AND/OR RECTANGULAR PLATES
Filed Feb. 17, 1966 5 Sheets-Sheet 1
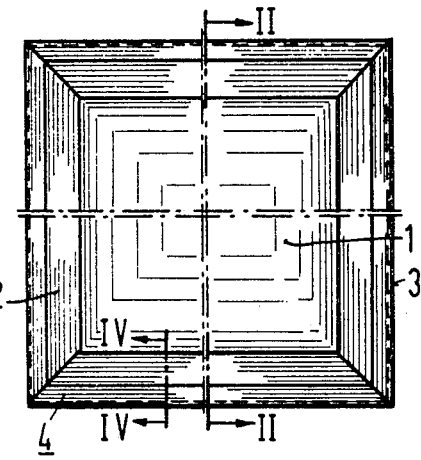
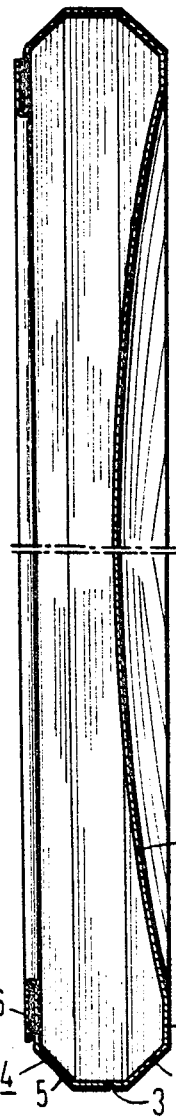
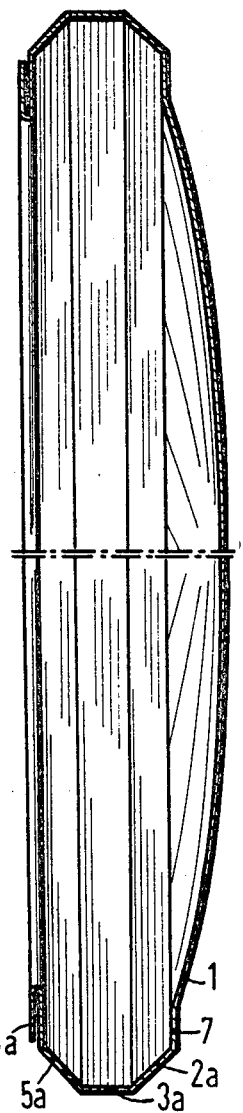
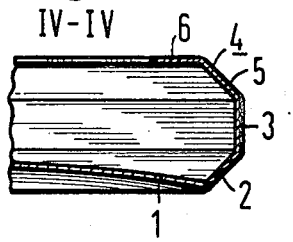
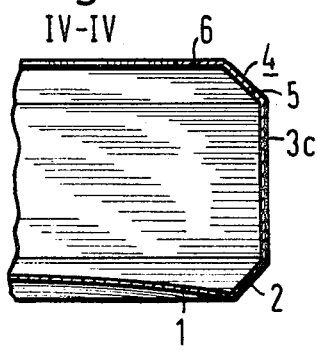
Helmut Gerhard
Applicant
Watson, Cole, Grindle & Watson
Attorneys Aug. 6, 1968     H. GERHARD     3,395,824
LIQUID CONTAINER COMPOSED OF SQUARE AND/OR RECTANGULAR PLATES
Filed Feb. 17, 1966     5 Sheets-Sheet 3
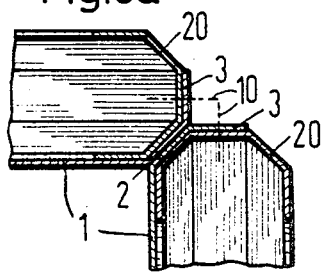
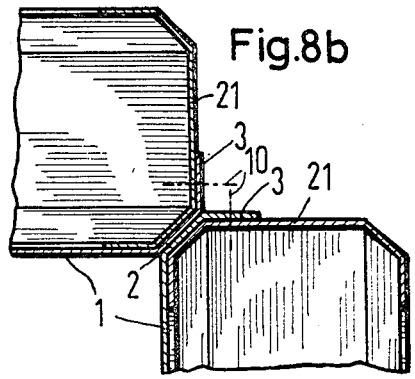
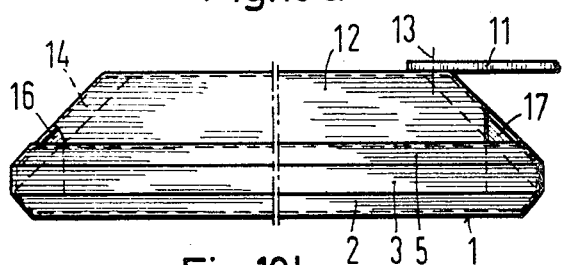
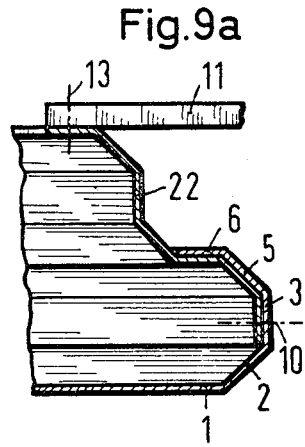
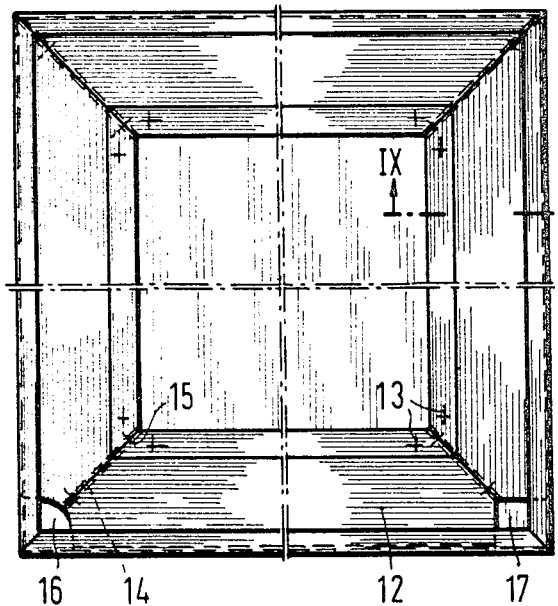
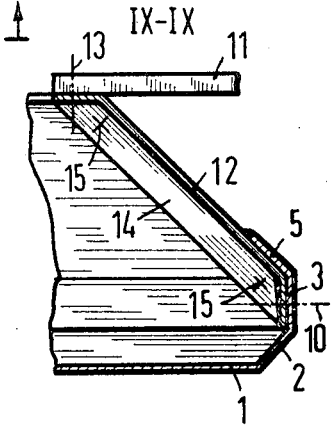
HELMUT GERHARD
APPLICANT
Watson, Cole, Grindle & Watson
ATTORNEYS Aug. 6, 1968 H. GERHARD 3,395,824
LIQUID CONTAINER COMPOSED OF SQUARE AND/OR RECTANGULAR PLATES
Filed Feb. 17, 1966 5 Sheets-Sheet 4

HELMUT GERHARD
APPLICANT
Watson, Cole, Grindle & Watson
ATTORNEYS

Aug. 6, 1968  H. GERHARD  3,395,824
LIQUID CONTAINER COMPOSED OF SQUARE AND/OR RECTANGULAR PLATES
Filed Feb. 17, 1966  5 Sheets-Sheet 5
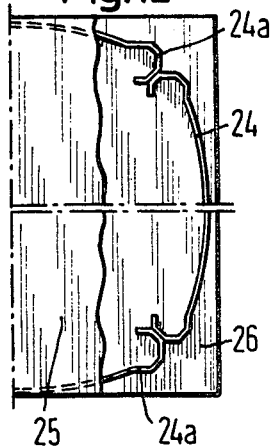
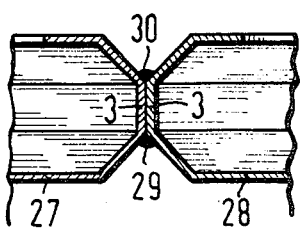
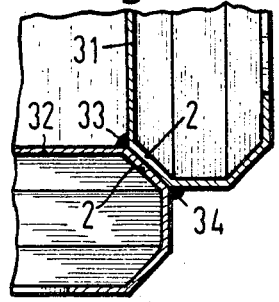
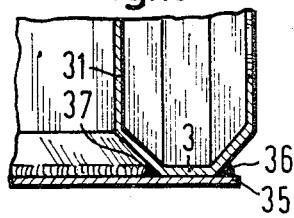
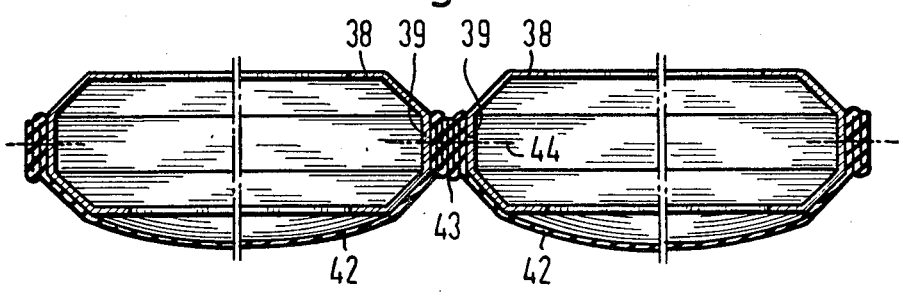
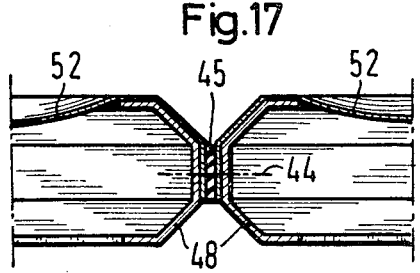
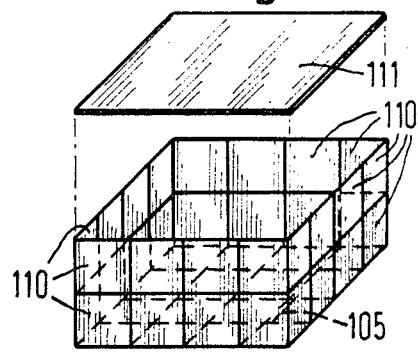
HELMUT GERHARD
APPLICANT
Watson, Cole, Grindle & Watson
ATTORNEYS United States Patent Office 3,395,824
Patented Aug. 6, 1968

3,395,824
LIQUID CONTAINER COMPOSED OF SQUARE AND/OR RECTANGULAR PLATES
Helmut Gerhard, Weitefeld 5241 (Sieg), Germany
Filed Feb. 17, 1966, Ser. No. 528,212
10 Claims. (Cl. 220—5)

ABSTRACT OF THE DISCLOSURE

This invention relates to modular receptacle construction plates formed of quadrangularly shaped panels having a margin extending around the periphery of the panel. The margin is formed by three integral face members inclined at 45° angles to one another. Means are provided to strengthen the margin and to extend the margin by the attachment of profile members. The configuration of the three faces enables the construction plates to be interconnected to provide a liquid container having improved strength without the necessity of reinforcing tie bars or struts.

---

Open or closed liquid containers are known, which are composed of square and/or rectangular plates, in which the individual plates have on their perimeter flanges with an inner face including an angle of 45° with the plane of the wall, and an outer face including an angle of 90° with the plane of the wall. When the outer faces of these flanges are drilled, the plates can be screwed to each other in their common plane with the interposition of sealing means so as to form a wall. On those places, where two walls meet one another at planes including a right angle with one another, the screw holes are made in the inclined inner faces of the flanges. All the flanges are then on the outside of the container. In order to increase the stiffness of the plates, the same may be provided with a stiffening profilation.

Such liquid containers have only a limited applicability, e.g. as dismountable water reservoirs of comparatively small size, since the resistance of the walls formed of these plates to bending and buckling is low. Although the resistance can be increased by internal bracing, the fitting of such bracing requires difficult work involving great circumspection and experience.

It is an object of the invention to provide a liquid container of the kind referred to wherein the faces of the flanges at least of the plates forming the side walls of the container have a stiffened margin.

The manner of stiffening of the margins may be selected in the workshop or on the site depending on the magnitude of stiffness desired, so that only one assortment of plates of uniform type has to be kept on stock. Each margin stiffener may be made either directly by appropriately shaping the plate itself, or it may be welded on, or subsequently arranged on the outer surface of the flange or of an extension thereof. In the latter case the additional margin stiffeners of any plate and/or of adjacent plates may be connected with one another, whereby a considerable stiffening of the whole wall of plates is attained in the manner of a lattice-work.

In some cases, particularly when the height of the plates is equal to the height of the container, flanges on the upper and lower margins of the plates may be dispensed with, and the plates may be butt-welded to the top and/or the bottom plate of the container. Thus the welding operations are simplified, if desired.

Some embodiments of the invention will be explained hereinafter by way of example with reference to the accompanying drawings, in which:

FIG. 1 is an elevation of a plate used according to the invention for the construction of a container;

FIGURES 2 and 3 are sections, on a larger scale, on the line II—II of FIGURE 1, of two different embodiments.

FIGURES 4 and 5 are part-sections, on a larger scale, on the line IV—IV of FIGURE 1 of further shapes of stiffened margins provided directly on the plates.

FIGURE 8a and 8b show two embodiments of additional profiles screwed or welded to the margins of known types of plates.

FIGURES 9a and 9b show two embodiments of additional profiles screwed or welded to the margins of plates, with a stiffener strut.

FIGURES 10a and 10b are a side and front elevation, respectively, on a smaller scale, of a plate according to FIGURE 9b.

FIGURE 12 is a part-section of another embodiment of a container of the type of FIGURE 11b.

FIGURE 13 shows an example according to the invention of a welded connection of two plates lying in the same plane.

FIGURE 14 shows an example according to the invention of a welded connection of two plates according to the invention meeting one another at an edge of the container.

FIGURE 15 shows by way of example a welded connection of a plate standing upon a smooth bottom; and FIGURES 16 and 17 show two embodiments, in which the plates consist of frame-like margin stiffeners and resilient panels.

FIGURE 18 shows diagrammatically a liquid container according to the invention.

Figure 11A:
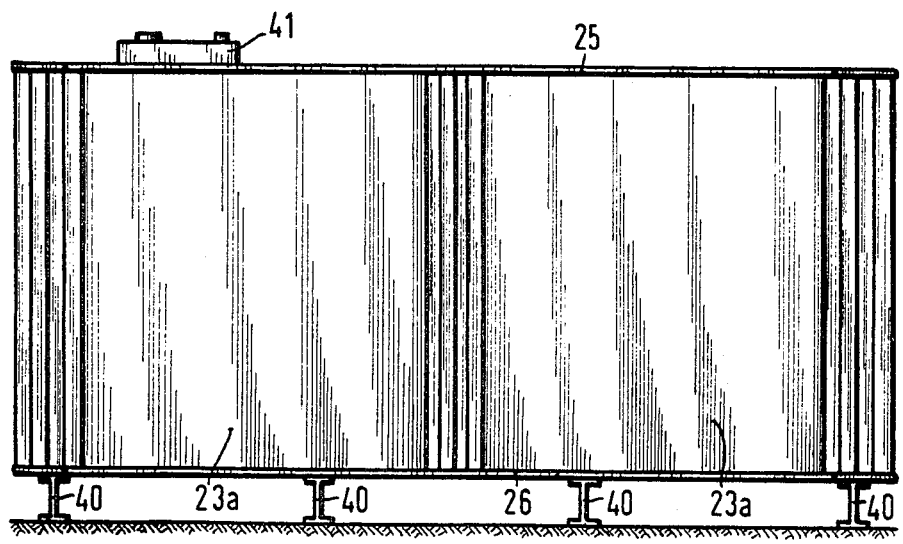
FIGURES 11a and 11b are an elevation and plan view, respectively, of a container according to the invention on a smaller scale in which the plates of the side walls are butt-welded to the bottom and top plates.
Figure 11B:
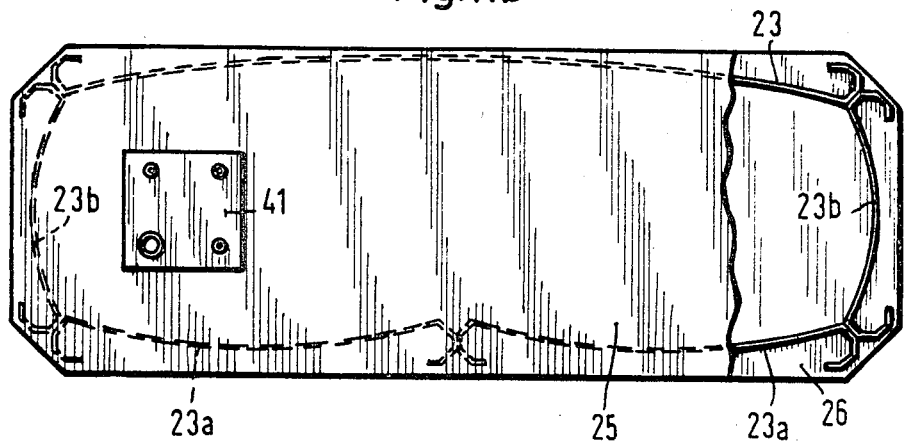

In FIGURE 18 there is shown a liquid container 100 composed e.g. of quadratic plates 110. Each side wall of the container comprises eight plates 110. The bottom wall 105 comprises sixteen plates 110. The top of the container may be open or covered by a large cover plate 111. Alternatively, the cover plate may be composed of several quadratic or rectangular plates. The bottom wall 105 may comprise one single plate (see FIGURES 11a and 11b).

FIGURE 1 is a frontal view of a square plate 110 improved according to the invention. However, rectangular plates may be used just as well. For example the widths of plates are stepped in the sizes of 0.5 m., 1.0, 1.5 m. and if desired 2.0 m. The lengths of the plates extend in steps of half a metre from 0.5 to 4.5 m. The choice of as large as possible plate areas is advantageous, since the seams requiring additional work for fitting and sealing then have a comparatively short length in proportion to the area. By appropriate shaping of the plate panels and the margins of the plates serving as connecting and stiffening elements, the required resistance to bending and buckling is assured. The stiffening shape of the plate panel consists preferably of an outward uniform curvature or belling of the plate.

FIGURE 2 shows a section of the plate 110 according to FIGURE 1 on a larger scale. The belled panel 1 is surrounded on the perimeter by a flange having an inner face 2 inclined at 45° to the plane of the wall, and an outer face 3 at 90° to the plane of the wall. When assembling several plates so as to form a wall, the contacting faces 3 are connected tightly with one another by screwing, clamping or welding. When using a clamped or screwed connection a sealing means is interposed or subsequently a sealing seam (welded seam) is provided in the interior of the container. When two different walls of the container meet one another, the connection of the edges of plates standing at right angles to one another is effected by means of the inclined faces 2.

According to the invention, the flange on the perimeter is provided with a margin stiffener 4 along its entire length. In the embodiment according to FIGURE 2 the same consists in a further face 5 inclined say 45° towards the centre of the plate and adjoining the outer face 3, and in a face 6 continuing parallel to the face of the plate and pointing towards the centre of the plate. The latter face may have twice the thickness of the plate so as to provide additional stiffness. All these additional faces are preferably formed by angularly turning up the material of the plate and subsequent interwelding at the corners. Thus a torsionally very stiff frame is formed, which increases the section modulus of the plates and of the container walls built of them to a very considerable degree.

The belling of the wall 1 may be produced by pressing or by vacuum drawing in a manner known per se. Should the face inclined at 45° of the flange be distorted thereby, a transition face 7 is preferably provided between the inclined face 2 and the belled face 1 of the plate. If desired, it is also possible to form the belling of the plate faces on the finished container by applying a stong internal excess pressure. Thereby, the joints are also tested for effective sealing.

In the embodiment according to FIGURE 3 flange faces 2a, 3a, 5a and 6a are provided similar to those in FIGURE 2; however the same are not, as in FIGURE 2, arranged on the outside of the container, but in the interior of the container. Thereby it made possible to increase the useful volume of the container by the space required by the plates with their stiffeners, provided that conditions of corrosion permit this. This kind of plate is also suitable for edge joints, since in accordance with the invention the faces 5a may be connected with one another.

In the embodiment according to FIGURE 4 the last face 6 of the margin has no reinforcement. FIGURE 5 shows the same geometrical shape, but has a stiffener face 3c continuing the face 3 in a common plane with the latter. Thereby a considerable increase of the section modulus is attained.

Instead of adapting the plate itself to the actual requirements, preferably additional profiles fixed to the margins of the plates are used in conjunction wtih a few simple forms of plates. Thus in the embodiments of the invention illustrated in the FIGURES 6a–6d, an additional margin stiffener 8 is provided, which may be clamped, when desired, to the margin of the plate. The profiles 8a, 8b and 8c are pushed over the margin of the plate and then interwelded at the corners. The profile 8d keeps itself by springiness on the margins of the plates after the same have been interwelded into a torsionally stiff frame.

Figure 6A:
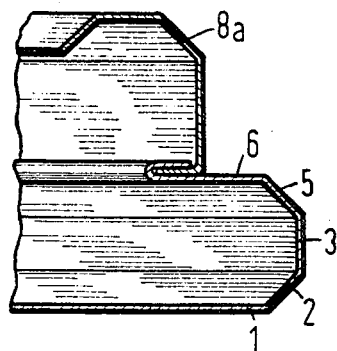
FIGURES 6a–6d are part-sections on the line IV—IV of FIGURE 1 of various embodiments of additional profiles clamped on the margins of the plate.
Figure 6B:
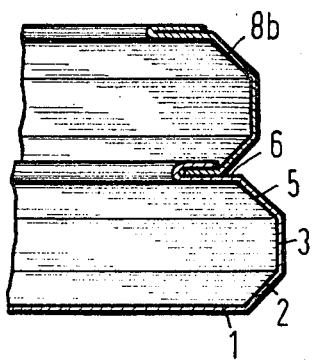
Figure 6C:
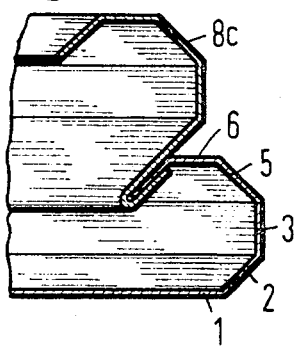
Figure 6D:
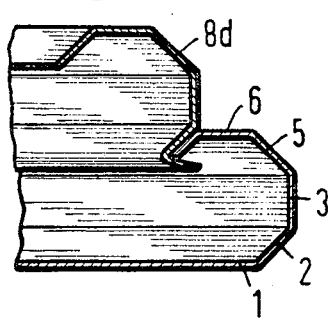
Figure 7A:
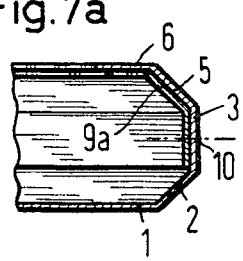
FIGURES 7a–7c show various embodiments of additional profiles screwed or welded to the margins of plates of the shape of the plate according to FIGURE 5.
Figure 7B:
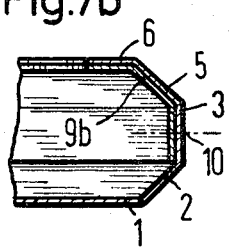
Figure 7C:
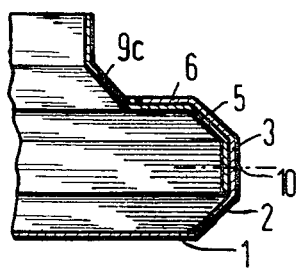

FIGURES 7a–7c show additional stiffener profiles 9a, 9b and 9c, which in a form of the plate according to FIGURE 4 are screwed at the point 10 to the face 3 turned up at 90°. In FIGURE 7a there are two faces of the margin of the plate reinforced like that, and in FIGURE 7b three of them. In FIGURE 7c the section modulus is strongly increased by further faces of the additional profile 9c.

Simpler still, according to FIGURES 8a and 8b, the construction is based on the known form of plates, in which only the face 2 inclined at 45° and the face 3 inclined at 90° exist. On the surface of the margin of the plate extending at right angles to the plate, reinforcement profiles 20 and 21 of various width may be attached (preferably screwed on), which allow a very good adaptation to the actual pressure conditions prevailing. If desired two or more of these reinforcement profiles may be put on top of one another, or the gauge of the sheet metal may be chosen differently. Containers of any length or width may thus be assembled by welding or screwing according to standardised layouts from a combinations of large plate units, without requiring any fitting work. If desired plates with different margin stiffeners adapted to the actual pressure conditions may be combined with one another.

The stiffener profiles protruding from the frames of the plates may be additionally connected with one another or from one plate to another plate by the aid of struts or strips. In this manner, on the principle of a lattice work a further considerable stiffening of the whole plate wall may be attained. FIGURE 9a shows this as applied to multiple fold stiffener profiles 22, which are connected with struts or strips 11. In accordance with FIGURE 9b a simple trapezium shaped folded profile 12 having a plane middle face is used. The same is connected at 10 and at 13, respectively, with the 90° face 3 and the strut 11, respectively, which latter is parallel to the plane of the plate.

As will be seen particularly in FIGURES 10a and 10b, the additional profiles 12, four of which form a truncated pyramid, may be built-in individually on assembly without subsequent welding operations. This facilitates the fitter's work between the plate wall and the wall of the surrounding room, wherein the liquid container is to be erected. The profiles 12 are chamfered at the edges and provided with screw flanges 15, which have screw holes 15. In order to facilitate assembly, arcuate or straight cut-outs 16 and 17, respectively, may be provided at the outer corners. Therefore, it is possible to provide the plates with the stiffeners, depending on the conditions of assembly, instead of in the workshop during producton, on the site itself, or to dispense with them altogether.

FIGURES 11 and 12 show two embodiments of a container according to the invention, whose height is equal to that of the plates. In this case the flanges at the upper and lower margin of the wall plates may be disposed with, so that the top 25 and the bottom 26 can be butt-welded to the plates. Obviously the bottom 26 could be provided with a stiffener all along its perimeter if required for reasons of strength. It may also be composed of individual plates according to the invention. The longitudinal walls in the container according to FIGURE 11 consist of one plate 23 or of several plates 23a tightly connected and sealed together. The front walls are formed of plates 23b. The bottom 26 rests on girders 40; a dome 41 is provided in the top 25.

While in the container according to FIGURE 11 the margin stiffeners of the plates 23, 23a and 23b are directed outwardly, the margin stiffeners of the plates 24, 24a of the container according to FIGURE 12 are placed inside. Thus a better exploitation of the volume available is attained; on the other hand, the subsequent attachment of additional stiffeners is then more difficult.

When the plates are screwed to one another, the sealing between them consists for example of an interposed sealing means, or of a sealing medium pasted, cast or stuck on them, which may be plastic or elastic and is compatible with the liquid to be stored. For this purpose e.g. natural rubber, silicon rubber, foam material with closed pores or similar materials may be used.

When the plates are to be welded to one another, the outer and inner edge of the mutually abutting faces are to each be provided with a weld seam. Embodiments thereof are shown in FIGURES 13–15. In FIGURE 13 two plates 27 and 28 lying in the plane of the wall abut one another. Their 90° faces 3 are connected with one another at the edges by weld seams 29 and 30.

In FIGURE 14 a vertically positioned wall plate 31 and a horizontal bottom plate 32 abut one another along their 45°-faces 2. The faces 2 are likewise connected with one another by two weld seams 33 and 34.

When a flat sheet metal piece is used as a bottom, the vertical wall plate 31 stands, in accordance with FIGURE 15, with its 90°-face 3 upon the bottom plate 35. The weld seams 36 and 37 to be applied there are rather difficult to reach. Therefore the use of plates without margin flanges is advantageous at this joint, as illustrated in FIGURES 11 and 12.

As a material for the plates of the containers, and for the margin stiffeners in particular, steel or non-ferrous metals are suitable. It is also possible, to make the margin stiffeners running all along the perimeter of a material different from that of the panels. The panels then fill out the frame-like margin stiffeners. For example refined steel or glass fibre-reinforced plastics may be used as plate panels, while the margin stiffeners consist of ordinary steel.

FIGURES 16 and 17 show two embodiments, in which the margin stiffeners 38, 48a are constructed as a frame, and serve as a mounting for sheets 42, 52 forming the plate panels. The sheets 42, 52 bulge out more or less strongly depending on the load, and thus automatically develop the required strength. Between abutting faces 39 of adjacent plates, the sheets 42 may be thickened or folded so as to form a seal 43, which is clamped in by means of screw connections 44 (see FIG. 16), or a sealing strip 45 may be laid between the sheets 52 (FIG. 17).

The sheets 42, 52 may consist of rubber or some other yielding material. Preferably, however, the sheets 42, 52 comprise thin sheets of stainless steel whereas the supporting frames 38, 48 are of mild steel. If the sheets 52 are on the inner side of the container wall they will protect the frames 48 against corrosion. Alternatively, if the contents of the container is not corroding, the frames 38 may be on the inner side of the wall whereupon the sheets 42 will bulge out to the outer side. Thereby, a more compact assembly will be obtained.

What I claim is:
1. A receptacle construction plate comprising;
    a quadrangularly shaped panel,
    a flange extending around the periphery of said panel, said flange including a first face member inclined 45° to a first imaginary plane formed through the peripheral edges of said panel,
    a second face member adjoining said first face member and extending therefrom at a 45° angle to be normal to said first imaginary plane,
    a third face member adjoining said second face member and extending therefrom at a 45° angle to be normal to a second imaginary plane formed by an extension of said first face member, said third face member including an extension angled at 45° to be parallel to said first imaginary plane.

2. A receptacle construction plate according to claim 1 wherein said second face member is elongated with respect to said first and said third face members.

3. A receptacle construction plate according to claim 1 further comprising a stiffener profile conforming to the shape of said flange and mounted to said third face member, said stiffener profile extending parallel to one side of at least two of said face members.

4. A receptacle construction plate according to claim 1 further comprising a transition face member integrally adjoining and extending from said panel in said first imaginary plane and integrally adjoining said first face member.

5. A receptacle construction plate according to claim 1 further comprising an additional flange member including an angled surface wherein said extension includes an end portion angled toward said panel, said angled surface having a U-shaped edge portion engaging said end portion to connect said flange and said additional flange.

6. A receptacle construction plate according to claim 1 wherein said extension includes a U-shaped cross section formed by doubling over the outer portions of said extension.

7. A receptacle construction plate according to claim 6 further comprising an additional flange member including an angled surface connected to said flange by said U-shaped cross section.

8. A container having wall members assembled from construction plates according to claim 1 wherein said second face members of adjoining plates are secured in abutting relationship and said third surface members of adjoining construction plates of two wall members forming an edge are secured in abutting relationship.

9. A container having wall members assembled from construction plates according to claim 1 wherein the construction plates serve as frame members for supporting sheet material forming said wall members, said second face members of adjoining plates are secured in parallel spaced relationship, said sheet material extending across said frame members from the opposing second face members of each of said construction plates, said sheet material being firmly secured between said second face members of adjoining plates.

10. A container according to claim 9 wherein said sheet material is folded at said second face members to form a seal.

References Cited

UNITED STATES PATENTS

| | | |
|---|---|---|
| 1,033,913 | 7/1912 | Lloyd. |
| 2,345,018 | 3/1944 | Teague et al. _____ 52—615 XR |
| 2,465,603 | 3/1949 | Potchen _____ 52—615 XR |

FOREIGN PATENTS

| | | |
|---|---|---|
| 199,590 | 6/1923 | Great Britain. |
| 585,484 | 2/1947 | Great Britain. |
| 435,341 | 10/1926 | Germany. |

RAPHAEL H. SCHWARTZ, *Primary Examiner.*